United States Patent [19]
Fok et al.

[11] Patent Number: 5,229,005
[45] Date of Patent: Jul. 20, 1993

[54] OCEAN DEPTH REVERSE OSMOSIS FRESH WATER FACTORY

[76] Inventors: Yu-Si Fok, 3185 Oahu Ave., Honolulu, Hi. 96822-1247; Sushil K. Gupta, A-2, Mridul Citadel 2, Shrishna Bodakder Society, Vastrapur, Ahmedabad 380 015, India

[21] Appl. No.: 650,302

[22] Filed: Feb. 4, 1991

[51] Int. Cl.$^5$ ............................................. B01D 61/08
[52] U.S. Cl. ........................................ 210/652; 210/170
[58] Field of Search .................... 210/170, 321.6, 652, 210/241, 242.1

[56] References Cited

U.S. PATENT DOCUMENTS 3,156,645  11/1964  Chapin et al. ............. 210/321.6 X
3,171,808   3/1965  Topp ........................... 210/321.6

Primary Examiner—Frank Spear

[57] ABSTRACT

A process for the desalination of sea water by lowering from a floating platform (11) sets of vessels (66), which are constructed or laminated in part with reverse osmosis elements (65) or (64), into the ocean depth to extract fresh water. Thereafter, the fresh water filled vessel (66) is to be lifted individually from the ocean depth by means of a mechanical lifting system (33) to a predetermined elevation above the sea surface to facilitate the delivery of the extracted fresh water to a coastal water transportation system via a valve (44) at the bottom of the vessel (66) which is also connected to a water delivery pipeline (55).

7 Claims, 4 Drawing Sheets

OCEAN DEPTH REVERSE OSMOSIS FRESH WATER FACTORY

BACKGROUND—FIELD OF INVENTION

This invention relates to an ocean depth reverse osmosis process to extract fresh water, and to mechanisms to perform the process which are used for filtering the sea water and for transporting the extracted fresh water from the ocean depth.

BACKGROUND—DESCRIPTION OF PRIOR ART

Sea water desalination plants have been constructed during the past four decades in places all over the world. In the recent decade, the reverse osmosis process desalination plants have become more popular in the United States because of the technological advances in the production of semi-permeable membranes.

On average, sea water has a high salt content, approximately 35,000 milligrams per liter of total dissolved solids (35,000 mg/1 TDS). In general, the osmotic pressure of natural water is approximately 10 psi (psi=pounds per square inch) per 1,000 mg/1 TDS. Therefore, desalination of sea water by a reverse osmosis (R.O.) process requires pressure greater than 350 psi and will usually need to maintain the pressure of 1,000 psi or more.

The high energy requirement needed to produce fresh water from salt water using a R.O. osmosis process is a major expenditure problem. According to a committee report of the American Water Work Association (AWWA Water Desalting and Reuse Committee—1989), the total production cost for the R.O. process including capital and O&M costs is as follows: (1) brackish water—ranges from $1.00 to $2.50/1,000 gallons and (2) sea water—ranges from $4.00 to $8.00/1,000 gallons. Thus, the additional cost to desalinate sea water ranges from $3.00 to $5.50/1,000 gallons. Therefore, a method must be found to lower the sea water desalination unit cost as soon as possible in order to use the vast ocean as a viable source of fresh water.

This invention will use the ocean's depth as the source of pressure needed in the R.O. process to extract fresh water from sea water. By using the following formula the required depth can be calculated: hydrostatic pressure, p, increases linearly from the sea surface to the ocean depth, h, with the specific weight of the sea water, $\gamma$, as the multiplier: $p = \gamma h$. Therefore, in order to have a pressure of 350 psi, the ocean depth should be set at 788 feet.

$$h = p/\gamma = 350 \text{ psi}/(64 \text{ lb}/144 \text{ in}^2 \times 1 \text{ ft.}) = 788 \text{ feet.}$$

Since the desalination of sea water usually requires approximately 1,000 psi, the R.O. process device should be lowered to an ocean depth of about 2,250 feet.

According to the book, *Desalination by Reverse Osmosis* (1970 and 1981—2nd edition edited by Jeanette Scott—edited by John McDermott, Noyes Data Corporation, Park Ridge, N.J., U.S.A.), there are two prior inventions which are relevant to this application. They are described and assessed as follows:

(A) Emergency Sea Water Purification—J. W. Chapin and J. S. Williams (U.S. Pat. No. 3,156,645; Nov. 10, 1964)

This method described an emergency sea water demineralizer which could provide emergency drinking water for lifeboat passengers. The sea water demineralizer (which is constructed with a semipermeable membrane for the reverse osmosis processing of sea water) was to be lowered to a minimum depth of 1,000-feet from the lifeboat. A spring-operated check valve would automatically release the entrapped compressed air as the device was lifted to a shallow depth before surfacing. Therefore, the pressure within the device would not be too great when it reached the hands of the lifeboat passengers.

This emergency sea water purification device's principle of desalination of sea water is plausible. However, there are two disadvantages of this method:

(1) The concern of the compressed air pressure developing inside the device is not entirely sound. Because the hollow container is semipermeable, the entrapped air would most likely find a way to leave the container as it is lifted to a shallower depth. According to Boyle's Gas Law: the product of pressure, p, and volume, V, of a given mass of air is a constant when air temperature is held constant:

$$p_1 V_1 = p_2 V_2 = \text{constant.}$$

The empty sea water demineralizer at sea level has 1 atmospheric unit of pressure. According to Boyle's Gas Law ($p_1 = 1$ atmo, $V_2 = 0.1 V_1$), after the demineralizer is lowered to a depth of 1,000 feet where 90 percent of its volume is filled with fresh water, the following applies:

$$1 \text{ atmo. } V_1 = p_2 (0.1 V_1),$$

$$p_2 = 10 \text{ atmospheric pressure} = 14.7 \text{ psi} \times 10 = 147 \text{ psi.}$$

Therefore, when the demineralizer is lifted to a depth of 331 feet, some of the compressed air will leave the device and consequently reduce the entrapped air pressure.

For our invention, the entrapped air pressure would be utilized to assist in the discharging of fresh water from its containing vessel.

(2) In addition, the scope of U.S. Pat. No. 3,156,645 was confined to provide drinking water for lifeboat passengers with as much as three gallons of fresh water for each operation. Our invention has a much larger scope of increasing the water supply to coastal users at a capacity of 10,000 gallons or more for each operation, or at a capacity of multi-million gallons of drinking water per day.

(B) Sea-Wall Conversion Technique—F. D. Carpenter (U.S. Pat. No. 3,060,119, Oct. 23, 1962)

This technique described a special sea-well in the shape of a sphere which could be lowered by means of a line from a boat. The hollow sphere is submerged by means of a weight to a distance above the ocean floor and to a depth greater than 827 feet in order to subject the sea-well to a hydrostatic pressure of 360 psi or higher. As a result of the pressure difference between the sea water hydrostatic pressure on the external surface of the sea-well and the atmospheric pressure internally, the sea water would be filtered through a interstitial lattice structure by means of reverse osmosis, thereby producing purified water inside the sea-well. The method for extracting the purified water inside the sea-well may be by pumping or by means of compressed air build-up inside the sea-well while it is being filled.

Again, this sea-well conversion technique is accurate in its principle of the desalination of sea water. However, the technique for extracting purified water inside the sea-well has two drawbacks:

(1) Extracting purified water by pumping required capital costs to buy the pump, its accessories and the O&M and energy costs for pumping.

(2) The extraction of purified water by means of compressed air build-up inside the sea-well may not work at all. As shown in the figure of U.S. Pat. No. 3,060,119, a half filled sea-well has only 2 units of atmospheric pressure which is equivalent to 29.4 psi. That is only enough to lift the sea-well about 66 feet which is far less than the required lifting distance of 827 feet as claimed. Furthermore, as shown in page 2, even if the sea-well has been filled to 90 percent of its volume, the compressed air pressure would only be 147 psi, only enough to lift purified water 331 feet above the sea-well but still short of the required lifting depth of 827 feet.

These two disadvantages of the Sea-Well Conversion Technique may be the reasons that the U.S. Pat. No. 3,060,119 has not been in use since 1962.

OCEAN DEPTH DESALINATION VESSEL

Our invention will use mechanical systems to lift the Ocean Depth Desalination Vessel above the sea surface so that the purified fresh water can be delivered by gravitational means to a water transportation system on coastal land instead of being pumped.

OBJECTIVES AND ADVANTAGES

Accordingly, several objectives and advantages of the ocean depth reverse osmosis fresh water factory are as follows:

(a) To provide a vessel which can be constructed in a variety of shapes for submergence into the ocean depth;

(b) To provide R.O. laminated membrane elements to be used as part of the wall of the sphere and/or R.O. cartridges to be used as part of the sphere's support structure;

(c) To provide mechanical systems responsible for the submergence and retrieval of the submersible sea water desalination vessel in the ocean;

(d) To provide mechanical systems to deliver the extracted fresh water from the submersible sea water desalination vessel to coastal land based water transportation and storage systems;

(e) To provide fresh water extracted by an ocean depth R.O. process as an alternate water supply to coastal water users at a competitive cost, and (f) To provide high quality fresh water to users.

BRIEF DESCRIPTION OF THE DRAWINGS

This invention describes a R.O. process for extracting fresh water from the ocean depth sea water using a mechanical system for the following: (1) to cause the submergence of the sea water desalination vessel into the ocean depth; (2) retrieval of the fresh water filled desalination vessel from the ocean depth and (3) delivery of the fresh water to coastal land.

The simplest form of structure for the process is illustrated diagrammatically in FIG. 1.

As shown in FIG. 1.1, one of the empty ROD vessels (66) with internal pressure at 1 atmospheric has been submerged into a predetermined ocean depth by means of a weight (77) which is attached to a line (99) of the pulley system (33). The line (99) is also supported by wheels (22) as shown. The weight (77) is heavy enough to lift more than twice the buoyant force of the ROD vessel (66) and the pulley system (33) is built on a platform (11) which may be a used ship or other vessel.

Figure 1:
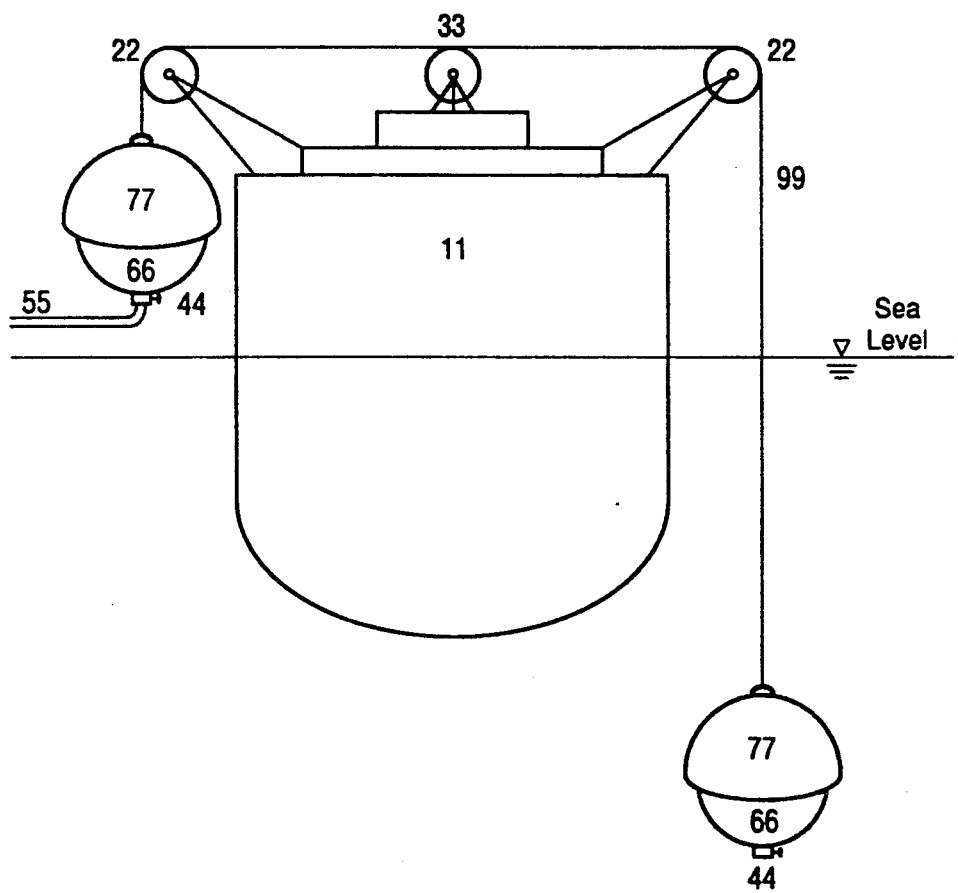
FIG. 1: Ocean Depth Reverse Osmosis Fresh Water Factory
1.1; Factory Function Plan
1.2; Fresh Water Outlet Control Valve
1.3; Membrane Lamination
1.4; R.O. Cartridge Arrangement A vessel (66) in its elemental form, called a reverse osmosis desalination vessel; and hereafter called ROD vessel, or just a vessel as illustrated in FIGS. 1.1 to 1.4; has demonstrated the process as a practical means for the extraction of fresh water from the ocean depth sea water.
Figure 2:
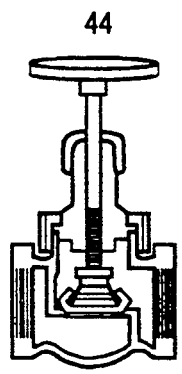
Figure 3:
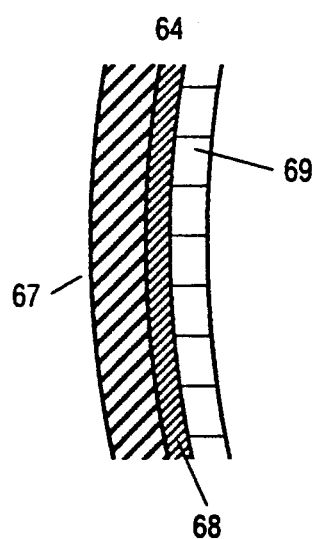
Figure 4:
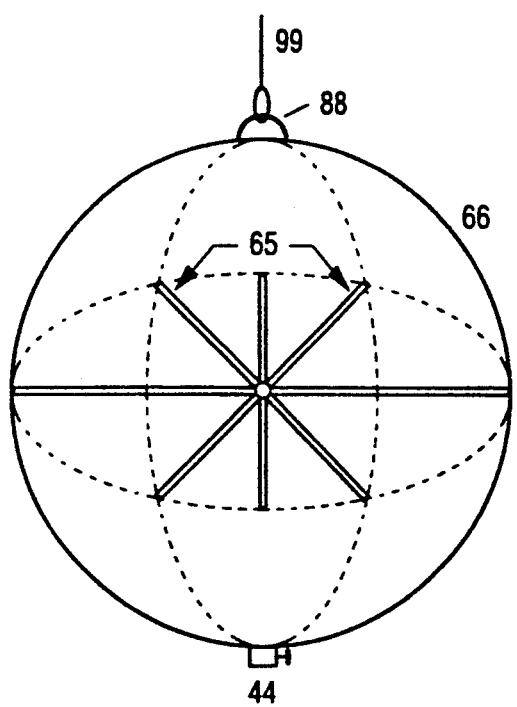

The depth to which the ROD vessel is submerged must be greater than 800 feet in order to subject the ROD vessel to a hydrostatic pressure of more than 350 psi. This is to activate the R.O. process of extracting fresh water from ocean depth sea water.

When the reverse osmosis extraction of fresh water is in progress, the air inside of the ROD vessel (66) will be compressed. If the ROD vessel (66) is filled to 90 percent of its volume, the internal pressure of the ROD vessel (66) will be increased to about 10 atms or increased from 14.7 psi to 147 psi. Therefore, in order to compensate for this pressure increase, the ROD vessel (66) should be submerged to a depth of 1,800 feet or more.

Once the ROD vessel (66) is filled to a predetermined capacity, the pulley system (33) will be activated to raise the ROD vessel (66) to the sea surface. It is then elevated above the sea surface so the fresh water can be extracted by gravitational means and transported to a coastal point to complete the process of water delivery.

This upward lifting process is started by separating the weight (77) from the fresh water filled ROD vessel (66) and lifting it with the pulley system (33) to a predetermined elevation above the sea surface, where it will be held stationary. Next, the pulley system (33) will start to lift the filled ROD vessel (66) and at the same time lower the empty ROD vessel on the other side of the platform (11). The empty ROD vessel is lowered to a predetermined ocean depth by means of a weight (77) placed on top of the vessel and at this depth the process of extracting fresh water will begin. Meanwhile, the filled ROD vessel (66) is lifted above the sea surface to a predetermined height where its fresh water can be unloaded by means of a valve (44) connected to a water delivery system (55), which will transport the water to a coastal point or to a water tank located below the platform.

For a simple construction, the valve (44) can be a Globe valve as shown in FIG. 1.2. This process of lowering one empty vessel (66) into the ocean depth and at the same time lifting the fresh water filled vessel from the ocean depth by means of the pulley system (33) can be repeated to maintain a series of fresh water delivery. Similarly, several sets of ROD vessels (66) and pulley systems (33) can be erected on the platform to complete the organization of an Ocean Depth Reverse Osmosis Fresh Water Factory of this invention.

FIG. 1.4 shows the elementary construction of the ROD vessel (66). As shown in FIG. 1.4, the ROD vessel (66) takes the shape of a sphere and the installation of the R.O. elements (65) can have three arrangements:

(1) Commercially available R.O. cartridges can be used as part of the support structure of the sphere; as shown in FIG. 1.4.

(2) R.O. membrane laminations can be used as part of the wall of the sphere. A similar one that had been shown in the U.S. Pat. No. 3,060,119 is shown in FIG. 1.3.

(3) A combination of the two arrangements; using R.O. cartridges as part of the sphere's structure and R.O. membrane laminations as part of the wall of the sphere; as shown in FIG. 1.4.

REFERENCE NUMERALS IN DRAWINGS

11 = Platform (it can be a refitted ship, tanker or other vessel fitted with water tank compartments)
22 = Pulley wheel supporting a line or a chain
33 = Pulley system (assembled with motor to drive the pulleys system to lift or lower the weight (77) and/or the ROD vessel (66))
44 = Valve (to control the outflow of fresh water from the vessel)
55 = Pipeline (that can be connected to valve (44) and water delivery system (55))
66 = Vessel (reverse osmosis desalination vessel (ROD vessel))
64 = Wall of the vessel (laminated with layers (67, 68, and 69))
65 = Assembly of reverse osmosis cartridges
67 = Outer layer of the wall of vessel (66)
68 = Layers of reverse osmosis membranes (between layers (67) and (69))
69 = Inner layer of the wall of vessel (66)
77 = Weight (which weighs about twice the buoyant force of the empty vessel (66), causing the vessel (66) to submerge)
88 = Lifting bail (of vessel (66) or of the weight (77))
99 = Lines or chains (capable of lifting the filled vessel (66) and/or the weight (77)).

OPERATION

This invention utilizes a floating platform (11) as shown in FIG. 1.1 to erect pulley systems (33) and to hoist the ROD vessel (66) from the ocean depth when it has been filled with extracted fresh water to a predetermined capacity. When the fresh water filled vessel (66) has been lifted to a predetermined elevation above the sea surface, a pipeline (55) will be connected to the vessel (66) via a valve (44) at the bottom of the vessel so that all the fresh water inside the vessel (66) can be emptied to a water transportation system.

The lowering of the vessel (66) into the ocean depth is by means of a weight (77), which is approximately twice as heavy as the buoyant force acting on the vessel (66). The weight (77) will lift the partially filled vessel (66) at the other end of the line (99) above the sea surface to facilitate the water transportation operation. The pulleys in the pulley assembly (33) are arranged in such a way that they can lift the weight (77) alone, or can jointly lift the weight (77) and the fresh water filled vessel (66) together. The pulleys' arrangement can also provide one unit of lifting force to the line (99) to hoist four units of weight or more according to the theory of pulley systems.

SUMMARY, RAMIFICATIONS, AND SCOPE

Accordingly, the reader will see that the ocean depth reverse osmosis fresh water factory of this invention can be used to produce fresh water by lowering a reverse osmosis membrane element equipped vessel into the ocean depth using a pulley and weight system. Once the submerged vessel has been filled to a predetermined capacity, the pulley systems will be activated to lift the vessel to a predetermined elevation above the sea surface so that the extracted fresh water inside the vessel can be discharged gravitationally via a valve connected to a pipeline system for transportation to users. In addition, the whole process described does not require the pumping of the extracted water.

The pulley systems can be arranged to use one unit of pulling force to lift four units of weight. The platform, from which the pulley systems are to be erected, can be a refitted old ship which costs considerably less than a new ship. Therefore, the capital cost of the ocean depth reverse osmosis fresh water factory is expected to be much lower than the existing land-based reverse osmosis sea water desalination plant having the same capacity because of the following reasons:

(a) There are no land and on-site development costs, thus yielding low capital costs;

(b) The invented factory can be located closely to the users; therefore water transportation costs are lower;

(c) No water right and right-of-way permits are required and the source is unlimited and renewable;

(d) Factory capacity can match water demand closely and can be developed quickly; and (e) The operation of the factory is located off-shore, and would, therefore, not present any brine disposal problems.

Although the description above contains many specifications, these should not be construed as limiting the scope of the invention, but as merely providing illustrations of some of the presently preferred embodiments of this invention. Two possible ramifications are presented as examples.

(A) For applications:
  (1) The ocean depth reverse osmosis fresh water factory can also be used in lakes, where the water is brackish and requires less water depth to produce the hydrostatic pressure for the R.O. process to extract fresh water. Likewise, this also applies to any water body;
  (2) This same factory can also be used for industrial waste water (laden with toxic solutions) treatment, in which the factory can be located below the designed hydrostatic depth required for the reverse osmosis process;
  (3) In addition, with conjunctive filtering processes, this factory can be located underground as the last stage of the treated waste water injection plant; and
  (4) Finally, this same desalination process can be used in submarines to supply a source of fresh water. The same process also applies to any underwater living quarters.

(B) For more complex designs:
  (1) Conveyer Belt Design
  According to FIG. 1.1, the ROD vessel (66) can be strung in intervals not only along a line (99) but also strung on a line leading to a coastal water storage/transportation system where its fresh water can be unloaded. Then the empty ROD vessel can be returned to the platform (11) for another round of the fresh water extraction process. To maximize the capacity of this process and reduce the load on the pulley line, the ROD vessel can be filled to a predetermined capacity, which will still allow the vessel to float. Once afloat in the water, the vessels can be pulled to a water collection destination on the shore and returned to the platform when emptied. Thus, creating an arrangement called the "conveyer belt design."

(2) Cable Car/Train System Design

This system can also use a cable car/train-like system. A rail track system can be laid on the ground leading to a predetermined ocean depth along the sea floor and back to the shore, so that the ROD vessels can be transported on the rail track according to a predetermined interval. The ROD vessel is designed to be heavy enough to remain on the rail track even when it is empty and strong enough to withstand the extremely high compression pressure of the ocean depth.

(3) Automation

This invention can be fitted with remote control automation systems to reduce labor costs and to increase the system's efficiency and safety.

Thus the scope of the invention should be determined by the appended claims and their legal equivalents, rather than by the examples given.

We claim:

1. A process for desalinating water comprising: (I) a pulley system with a reverse osmosis apparatus; (II) a weight means attached to each end of the pulley line; (III) lowering one end of the said line and its attached apparatus into the water to be desalted while simultaneously raising the other end of the pulley line and its attached apparatus to above the water level; and (IV) discharging the desalinated water from the raised reverse osmosis apparatus.

2. The process of claim 1 wherein the two reverse osmosis apparatus of equal size and shape are used.

3. The process of claim 2 wherein a series of said reverse osmosis apparatus are used in the form of a conveyor belt/string system.

4. The process of claim 1 wherein the two reverse osmosis apparatus are attached to the opposite ends of a pulley line.

5. The process of claim 1 wherein each reverse osmosis apparatus has an additional weight twice the buoyant force of the said vessel and the weight is set on top of the said vessel.

6. The process of claim 1 wherein the said additional weight can be lifted separately of the reverse osmosis apparatus and placed over one or the other reverse osmosis apparatus.

7. The process of claim 1 wherein the process assembly can be erracted and operated from a floating platform.

* * * * *